(12) United States Patent
Serio et al.

(10) Patent No.: US 11,836,816 B1
(45) Date of Patent: *Dec. 5, 2023

(54) SYSTEMS AND METHODS FOR VERIFICATION OF PROPERTY RECORDS

(71) Applicant: FIRST AMERICAN FINANCIAL CORPORATION, Santa Ana, CA (US)

(72) Inventors: Dianna Lee Serio, Irvine, CA (US); Annette Marie Cotton, Orange, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,565

(22) Filed: Feb. 28, 2023

Related U.S. Application Data

(63) Continuation of application No. 17/111,013, filed on Dec. 3, 2020, now Pat. No. 11,593,330, which is a continuation of application No. 14/871,560, filed on Sep. 30, 2015, now Pat. No. 10,878,521.

(51) Int. Cl.
| | |
|---|---|
| *G06Q 50/16* | (2012.01) |
| *G06F 16/23* | (2019.01) |
| *G06F 16/215* | (2019.01) |
| *G06F 16/25* | (2019.01) |
| *G06F 16/2457* | (2019.01) |
| *G06F 40/186* | (2020.01) |

(52) U.S. Cl.
CPC ......... *G06Q 50/167* (2013.01); *G06F 16/215* (2019.01); *G06F 16/23* (2019.01); *G06F 16/24578* (2019.01); *G06F 16/258* (2019.01); *G06F 40/186* (2020.01); *G06Q 50/16* (2013.01)

(58) Field of Classification Search
CPC ................. G06F 16/215; G06F 16/258; G06F 16/24578; G06F 40/186; G06Q 50/16
See application file for complete search history.

(56) References Cited

U.S. PATENT DOCUMENTS

2007/0067180 A1  3/2007  James et al.
2012/0323799 A1  12/2012  Treadwell et al.

OTHER PUBLICATIONS

Uniform Mortgage Data Program: Fannie Mae and Freddy Mac-Uniform Appraisal Dataset Specification: Field-Specific Standardization Requirements, Document Version 1.1, Feb. 18, 2011, 37 pages.
ArcGIS, How to standardize an address, (2011), Accessed: Aug. 20, 2020, 2 pages.

*Primary Examiner* — Aryan E Weisenfeld
(74) *Attorney, Agent, or Firm* — Sheppard, Mullin, Richter & Hampton LLP

(57) ABSTRACT

Systems and methods for verification of public property records and other information associated with real estate properties compare information from different providers. The information is formatted in different provider-specific ways. The systems and methods enable comparisons through predetermined sets of textual manipulations that counteract or remedy differences in formatting, collection methodology, and data management practices.

20 Claims, 10 Drawing Sheets

300 recorded in the County of Sacramento
Mark Norris, Clerk/Recorder
7.00
199908302162 2:47pm 08/30/99
004 11002062 11 03
RE2 1 01 OTT Paid 7.00 0.00 0.00 0.00 0.00
0.00 0.00

*Fig. 3A*

| FIPS | RecordingDate | RecordersBookNumber | RecordersPageNumber | DocumentNumber |
|------|---------------|---------------------|---------------------|----------------|
| 06067 | 19990830 | 990830 | 2163 | NULL |
| 06067 | 19990830 | 990830 | 2162 | NULL |

| fips | HIST_SR_DATE_TRANSFER | HIST_SR_DOC_NBR_FMT | HIST_SR_DOC_NBR_RAW | HIST_SR_DOC_BOOK | HIST_SR_DOC_PAGE |
|------|----------------------|---------------------|---------------------|------------------|------------------|
| 6067 | 19990830 | 00002163 | 0830-2163 | 121 | |
| 6067 | 19990830 | 00002162 | 0830-2162 | 121 | |

*Fig. 3C*

400 ◂ GRANT DEED

Fig. 4A

| RecordingDate | B_Recording_Date | DocumentNumber | B_Document_Number | APN | B_APN |
|---|---|---|---|---|---|
| 20120601 | 2012-06-01 | 2012180502 | 000000180502 | 486-33-62-1 | 486-0033-062-01 |
| 20120601 | 2012-06-01 | 2012181159 | 000000181159 | 84C-723-4-12 | 084C-0723-004-12 |
| 20120601 | 2012-06-01 | 2012181171 | 000000181171 | 507-25-8 | 507-0025-008 |
| 20120601 | 2012-06-01 | 2012181316 | 000000181316 | 69-80-12 | 069-0080-012 |

| DocumentNumber | Source 2_Document_Number | Source 1_APN | Source 2_APN |
|---|---|---|---|
| 1196981 | 000001196981 | 33-2S-21-42320-00A-1005 | 21-2S-33-42320-00A-1005 |
| 1196984 | 000001196984 | 03-3S-20-34360-00A-0070 | 20-3S-03-34360-00A-0070 |
| 1196986 | 000001196986 | 17-1S-19-23050-000-0070 | 19-1S-17-23050-000-0070 |
| 1196999 | 000001196999 | 17-3N-20-28080-028-0030 | 20-3N-17-28080-028-0030 |
| 1197001 | 000001197001 | 08-3S-19-25040-00F-0080 | 19-3S-08-25040-00F-0080 |
| 1197012 | 000001197012 | 29-2S-21-42920-000-003C | 21-2S-29-42920-000-003C |
| 1197019 | 000001197019 | 27-3S-18-16430-0MM-0060 | 18-3S-27-16430-0MM-0060 |
| 1197024 | 000001197024 | 35-3S-18-16200-00B-0213 | 18-3S-35-16200-00B-0213 |
| 1885303 | 000001885303 | 00060140000000056825 | 00060140-000000 |
| 1885311 | 000001885311 | 00068820000000346725 | 00068820-000000 |
| 1885326 | 000001885326 | 00050190000000336725 | 00050190-000000 |
| 1885329 | 000001885329 | 00064640000101056825 | 00064640-000101 |
| 1885371 | 000001885371 | 00064640000409056825 | 00064640-000409 |
| 1885397 | 000001885397 | 00124100000107356725 | 00124100-000107 |
| 1885406 | 000001885406 | 00054980000000346725 | 00054980-000000 |
| 1885409 | 000001885409 | 00119970000000136726 | 00119970-000000 |
| 2012000121181 | 000000121181 | 29-46-26-05-0000A.0240 | 29-46-26-E2-0500A.0240 |
| 2012000121276 | 000000121276 | 31-43-23-C2-04333.0010 | 31-43-23-C2-04327.0270 ← 501 |
| 2012000121393 | 000000121393 | 32-46-25-12-00005.0102 | 32-46-25-E3-12005.0102 |
| 2012000121412 | 000000121412 | 14-44-26-02-00012.0050 | 11-45-26-06-00070.0050 ← 502 |

| DocumentNumber | B_Document_Number | SalesPrice | B_Sales_Price | TotalTransferTax | B_Doc_Transfer_T... |
|---|---|---|---|---|---|
| 2012-0327543 | 000000327543 | 165500 | 147318 | 182.05 | 162.05 |
| 2012-0330177 | 000000330177 | 1540000 | 1490909 | 1694.00 | 1640.00 |

Verified Record Rules & Scoring

| | Parcel Number | Price Amount | Sale Date | Mortgage Amount | Total |
|---|---|---|---|---|---|
| Weighted Values | 35% | 30% | 10% | 25% | 100% |
| | | | | | |
| Sample Scoring Results | Parcel Number | Price Amount | Sale Date | Mortgage Amount | Total |
| Source A -> Source B | 1 | 0 | 1 | 1 | 0.7 |
| Source A -> Source C | 1 | 1 | 1 | 1 | 1 |
| Source B -> Source C | 1 | 0 | 1 | 1 | 0.7 |
| | | | | | |
| Source A & Source C are deemed accurate and higher quality than Source B. | | | | | |

LAST MARKET SALE

| | |
|---|---|
| SALE PRICE DATE | 05/30/2012 \| 06/29/2012 |
| PRICE PER SQ. FT. | $116 |
| SELLER NAME | ROSAS HEBRAIZ |
| 1ST MTG AMT \| TYPE | $123,626 \| FEDERAL HOUSING ADMINISTRATION |
| SALE PRICE \| TYPE | |
| MULTI SPLIT SALE | |
| 1ST MTG RATE \| TYPE | |
| DEED TYPE | |
| NEW CONSTRUCTION | $135,000 \| UNKNOWN |
| TRANSFER DOC | 2012.972422 |
| 1ST MTG DOC# | 2012.972423 |

| mls_sold_date | mls_SOLD_PRICE | deed_sale_date | deed_Sale_Price | Fips | MLS_STATUS | MLS_LIST_DATE | MLS_LIST_PRICE | HOUSE_NBR | STREET |
|---|---|---|---|---|---|---|---|---|---|
| 05/30/2012 | 125000 | 2012-05-30 | 135000.00 | 6037 | Closed | 04/01/2012 | 125000 | 10835 | GORMAN |
| 03/15/2013 | 589000 | 2013-03-15 | 580000.00 | 6037 | Closed | 01/18/2013 | 589000 | 3219 | STEVELY |
| 2015-04-10 | 557000 | 2015-04-10 | 342500.00 | 6037 | Sold | 2015-03-26 | 0 | 26784 | Pamela Dr |
| 04/30/2013 | 419000 | 2013-04-30 | 410000.00 | 6037 | Closed | 03/14/2013 | 419000 | 14612 | SUSAN |
| 07/17/2012 | 735000 | 2012-07-17 | 725000.00 | 6037 | Closed | 06/04/2012 | 725000 | 1229 | SOLITA |
| 11/13/2012 | 498888 | 2012-11-13 | 499000.00 | 6037 | Closed | 04/02/2012 | 499900 | 1110 | PATEL |
| 04/30/2013 | 185000 | 2013-04-30 | 205000.00 | 6037 | Closed | 02/14/2013 | 175000 | 18810 | VISTA DEL CANON |

901

| Scoring Results | Parcel Number | Price Amount | Sale Date | Mortgage Amount | Weighted Composite Score |
|---|---|---|---|---|---|
| Source D Compared to C | 2 | 2 | 2 | 1 | 12 |
| Source C Compared to B | 1 | 2 | 2 | 1 | 10 |
| Source D Compared to B | 1 | 1 | 2 | 2 | 10 |

Fig. 10

SYSTEMS AND METHODS FOR VERIFICATION OF PROPERTY RECORDS

CROSS-REFERENCE TO RELATED APPLICATIONS

The present application is a continuation of and claims priority to U.S. patent application Ser. No. 17/111,013 filed Dec. 3, 2020, titled "Systems And Methods For Verification Of Property Records," and issued as U.S. Pat. No. 11,593,330 on Feb. 28, 2023, which is a continuation of U.S. patent application Ser. No. 14/871,560 filed Sep. 30, 2015, titled "Systems And Methods For Verification Of Property Records," and issued as U.S. Pat. No. 10,878,521 on Dec. 29, 2020. All of the above applications are incorporated herein by reference in their entirety.

TECHNICAL FIELD

The systems and methods described herein generally relate to verification of public property records, and, in particular, various embodiments relate to systems and methods for verifying property records based on information from multiple sources.

DESCRIPTION OF THE RELATED ART

Public property records contain information about real estate properties. This information is relevant for (prospective) real estate transactions. For example, relevant information for a particular real estate property may include the most recent sales price, sales date, seller and buyer identification, loan amounts, tax rates and amounts as well as other information. The information may be relevant for individuals and for service providers that are associated with real estate transactions, including but not limited to financial institutions, mortgage providers, appraisers, real estate brokers, escrow companies, and other service providers that are associated with real estate transactions. Individual records may be available at local governmental offices, including but not limited to the county clerk's office, the tax assessor's office, and so on.

Some companies offer or provide property record information, e.g. to multiple service providers, for multiple real estate properties or multiple real estate transactions. Such companies may be referred to as record providers. Service providers may receive property record information from one or more record providers. The received property record information may include different types of errors. By way of non-limiting example, one type of error may be a data-entry error. For example, a particular price may be listed as $100,000 on a public property record, but entered as $10,000 when the record is entered (and subsequently provided) by a record provider. Service providers and their customers may have an interest in processes that verify public record information, and in services or products based on such processes.

BRIEF SUMMARY OF EMBODIMENTS

One aspect of the disclosed technology relates to a system for verification of property records, in particular public property records. As used herein, the term verification may refer to a reduction in the likelihood that particular information includes any type of error. In some implementations, the system may receive and compare property records from different record providers. If the information for the same real estate property is consistent among the different record providers, this may indicate a high likelihood that the information is correct. If the information for the same real estate property transaction fails to match or is inconsistent among the different record providers, the system may, in some implementations, attempt to determine which information from which record provider appears to be more trustworthy.

Public records are created uniquely; hence, there is variability across electronic files, recorded documents, and other materials used in the data management process. Information on documents could be illegible or handwritten and therefore subject to misinterpretation. Information may only be available at specific jurisdictional offices, forcing the collection process to be managed remotely, and therefore subject to collection errors. Information on electronic files can be converted disparately. Further, information formatting is often subject to database limitations and therefore can be stored and served to consumers differently (even for the same properties from the same original source). As a result of all these issues, consumers of property information need to verify (by way of non-limiting example) that 1) the information they are using is accurate, 2) it represents the correct information about the property and the transaction event (e.g., sale, financing, etc.) and 3) the decisions and outcomes resulting from the use of the information are accurate (e.g., value conclusion, credit approval, etc.). By virtue of the systems, methods, and technology described herein, consumers of property information may benefit from various improvements, including but not limited to improved information, improved time to access or gather certain information, improved confidence and accuracy regarding certain information, improved decisions and outcomes derived from using certain information, and/or other benefits.

A record provider may provide property records, or, more commonly, may provide information based on property records. Record providers may interchangeably be referred to as data aggregators or third-party data aggregators. For example, an actual property record may be available for inspection through a local governmental office, such as the county clerk's office of a particular county. An entry of an actual property record may include multiple types of information including, for example, the names of the parties involved in a real estate transaction, the date of a real estate transaction, the price or other consideration for a real estate transaction, and other characteristics of property records. The record provider may create a set of information, based on an actual property record that has multiple data fields. One or more data fields in the created set of information may be associated with one or more types of information included in an actual property record. As used herein, the term "set of information" refers to a set of information as received from a record provider, that is based on a property record, and that includes multiple data fields.

For the same real estate property or the same actual property record, different record providers (i.e. different data aggregators) may independently create different sets of information. For example, different record providers may be distinguished by referring to a first record provider, a second record provider, a third record provider, and so forth. The formatting used to create each set of information, including the data formatting, may be specific to a particular record provider. The number or types of data fields used to create each set of information may be specific to a record provider. Some types of information may be included or combined by a first record provider, but excluded by a second record provider. The implementation of this entry may differ among the record providers. For example, in some implementations, the formatting of dates of a real estate transaction may be included in a text data field following a CCYY-MM-DD entry. Alternatively, and/or simultaneously, in some implementations, the date of a real estate transaction may be included in a numeric data field following a DDMMCCYY format. Due to procedural and substantial differences between the operations of record providers, an easy or automated comparison between sets of information received from different record providers may not be available.

Comparisons requiring manual or clerical intervention per individual real estate property are unsuitable, impractical, or impossible as a matter of scale. By way of non-limiting example, service providers may need verified information regarding thousands or more real estate properties in some cities, to millions or more in some states or nationally in the United States. Manually verifying a property record, or a set of information based on a property record cannot be accomplished consistently covering thousands or millions of properties. Accordingly, embodiments of the systems and methods disclosed herein can be configured to provide service providers with a consistent verification process that produces reliable information.

County clerk's offices are not the only sources of property records. Property records may be maintained by other custodians, both commercial and governmental (by way of non-limiting example, at municipal, county, state, or federal level, and other governmental levels). Property records may include deeds, title documents, mortgages, liens, foreclosure information, appraisal information, listing information (e.g. through the Multiple Listing Service, or MLS), loan applications, promissory notes, tax records, and other types of information pertinent to a real estate property or to other real estate transactions. By way of non-limiting example, deeds may include deeds of conveyance, deeds of trust, and/or other types of deeds.

The information received from a record provider may include one or more sets of information such that individual sets of information are based on individual property records. Individual sets of information may correspond to individual real estate properties. Data fields in a particular set of information may be associated with characteristics of a particular property record transaction (or a particular real estate property). To enable comparisons and analysis of different data fields, the system for verifying property records may be configured to transform data fields to create transformed data fields. Such transformations can provide consistency among data fields (e.g., consistency of formatting) across multiple sources of information to allow comparison of the data between those sources. These transformations may be based, for example, on textual or numerical manipulations or other types of transformations. By way of non-limiting example, textual manipulations may include truncation, padding, transposition, insertion, concatenation, addition, arithmetic operation, and other textual manipulations. Transformed data fields may be compared with other transformed data fields or with data fields that have not been transformed.

In some implementations, the type or order of different transformations may be prescribed or defined by transformation templates. In other words, a transformation template may prescribe or define one or more steps to transform a particular data field (or multiple particular data fields) into a transformed data field (or multiple transformed data fields).

Embodiments of systems and methods for verifying property records may be configured to determine verification scores for public property records, public property record transactions, real estate properties, or any combination thereof. A particular verification score may be based on analyses or comparisons of information provided by multiple providers, including information in sets of information (e.g. from a record provider), transformed data fields, and other information. In some implementations, a verification score may be binary (e.g. "Verified" or "Unverified"), a percentage that reflects the level of confidence in the information available in public records, a letter grade that reflects the quality of the information available in public records, or other information or tag that indicates the state of verification of information available in public records, as well as combinations thereof.

Embodiments of systems and methods for verifying property records may include a variety of components to perform its operations and support its features. An example system may include one or more of electronic storage, one or more physical processors, a network interface, computer program components, as well as other components. The system may include a server that communicates with, by way of non-limiting example, one or more client computing platforms that are associated with one or more users, one or more communication networks, and other entities described herein. Individual users may interact, e.g. through browser software applications and other software applications or user interfaces executed on client computing platforms, with components of the system. By way of non-limiting example, the one or more communication networks may include the internet, and other communication networks. As used herein, mobile applications such as apps on smart phones, tablets, and other mobile devices are included in the term software application. The software application may be configured to render, interpret, and display information for presentation on a computing platform.

The server may include one or more processors configured to execute computer program components. The computer program components may include a reception component, a transformation component, a comparison component, a verification component, a storage component, an extraction component, a template component, a generation component, and other components.

One aspect of the disclosed technology relates to methods for verification of property records, in particular public property records. As used herein, verification of a property record may include verification of a property record transaction. These methods may be performed on or by, or be performed with assistance of the described systems for verification of property records in this disclosure.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various embodiments, is described in detail with reference to the following figures. The figures are provided for purposes of illustration and description. These figures are provided to facilitate the reader's understanding of the disclosed technology and shall not be considered limiting of the breadth, scope, or applicability thereof. It should be noted that for clarity and ease of illustration these drawings are not necessarily made to scale.

FIGS. 3A-3B-3C illustrate examples of a portion of a property record and two sets of information corresponding thereto.

FIGS. 4A-4B illustrate examples of a portion of a grant deed and sets of information that include a corresponding set.

FIG. 5 illustrates examples of sets of information provided by different record providers.

FIGS. 6A-6B illustrate examples of a portion of a recorded deed and sets of information that include different transfer tax amounts.

FIG. 7 illustrates an overview of comparisons among three sets of information from three different record providers.

FIGS. 9A-9B illustrate examples of a set of verified information and listing information that includes a different sales amount.

FIG. 10 illustrates an overview of comparisons among three sets of information from three different record providers.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

The technology disclosed herein is directed toward systems and methods for verification of property records. Property records may correspond to real estate properties and real estate transactions. In some implementations, the system may receive and compare property records from different record providers. If the information for the same real estate property matches between the different record providers, this may indicate a high likelihood that the information is correct. If the information for the same real estate property fails to match between the different record providers, the system may, in some implementations, attempt to determine which information from which record provider appears to be more trustworthy.

Figure 1:
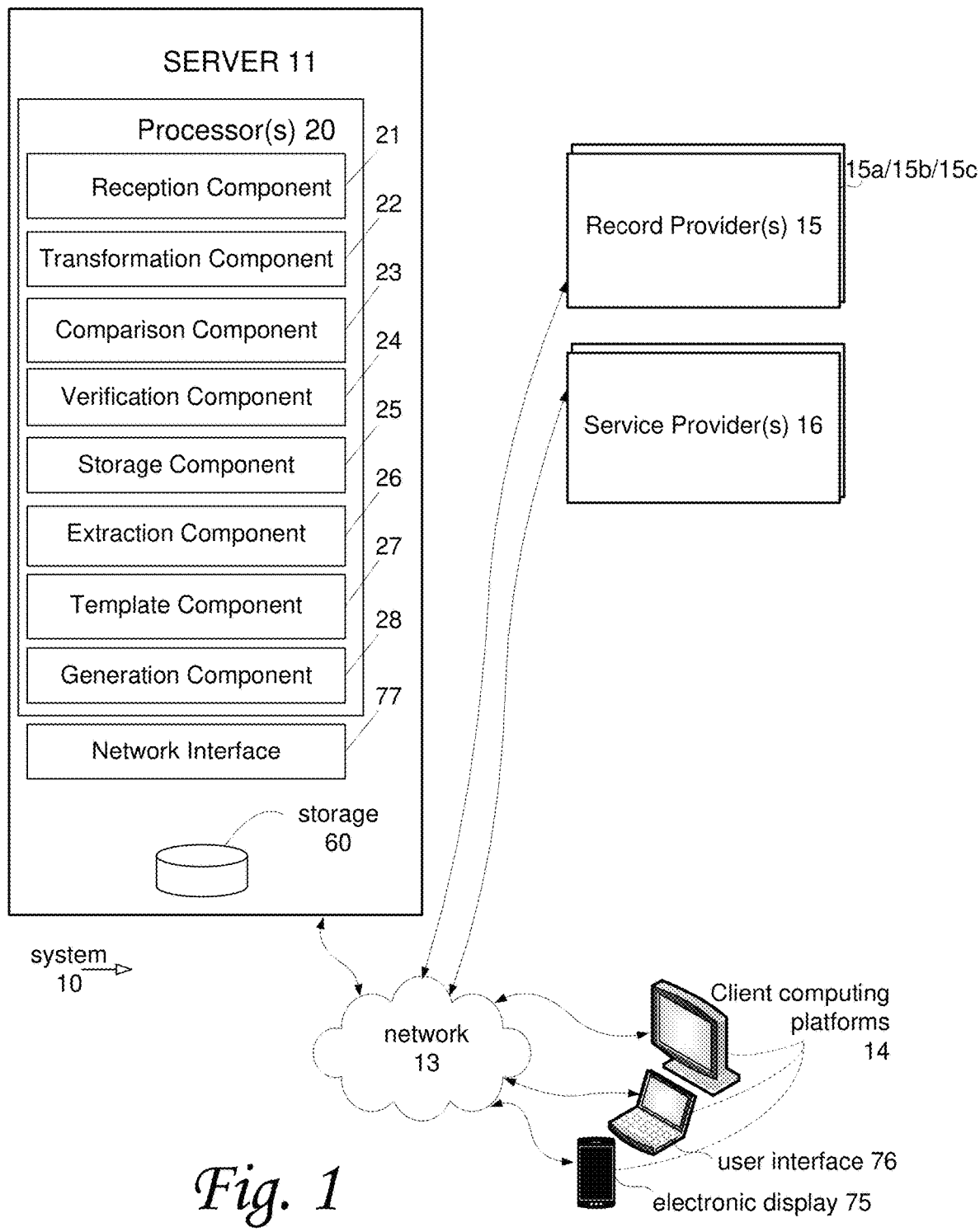
FIG. 1 schematically illustrates a system for verification of property records in accordance with one or more embodiments of the technology described herein.

FIG. 1 schematically illustrates an example system 10 for verification of property records. As illustrated in FIG. 1 by way of non-limiting example, system 10 may include one or more servers 11, one or more client computing platforms 14, one or more record providers 15, one or more service providers 16, one or more physical processors 20, electronic storage 60, a network interface 77, a user interface 76, an electronic display 75, one or more computer program components, and other components. The components in FIG. 1 may be communicatively coupled through one or more networks 13, including but not limited to the Internet. System 10 may be deployed, at least in part, using network 13 (e.g., a public network), or using commercial web services.

One or more physical processors 20 may be configured to execute computer program components. The computer program components may include a reception component 21, a transformation component 22, a comparison component 23, a verification component 24, a storage component 25, an extraction component 26, a template component 27, a generation component 28, and other components.

By way of non-limiting example, the following exemplary use case illustrates various basic features of the technology disclosed herein. A prospective buyer may be interested in a particular real estate property in county "X." The buyer, his real estate agent, his mortgage adviser, and the financial institution interested in providing a mortgage to this buyer (jointly referred to as the interested party) may be interested to know the purchase history of the particular real estate property, in particular its most recent sales date and sales price. However, the interested party may not be willing to fully trust or believe information contained in the pertinent property record provided by record provider 15a, because there is a risk that it might contain errors.

Accordingly, system 10 may be used to verify the property record for the particular real estate property (which may be referred to as the property record of interest or the property record transaction of interest) by requesting and receiving information from at least two independent record providers, e.g. record provider 15a and record provider 15b, and comparing the information from the two record providers to determine the level of consistency. This information may be received by reception component 21. Both record providers may have processed property records from the county in which the property resides, and produced sets of information based on the property records, including the property record of interest. Each set of information may include multiple data fields associated with characteristics of the property record of interest. For example, the characteristics may include one or more of a recorder's book number, a recorder's page number, an instrument number, a document number, an assessor parcel number (APN), a sales date, a sales price, a loan amount, and so on.

In this use case example, system 10 may include a first set of information from record provider 15a and a second set of information from record provider 15b. However, these record providers may have processed or formatted the information in the same property record of interest in different ways or with different results. For example, the APN in the first set of information may be "123456789" whereas the APN in the second set of information may be "00123-045-006789" due to the particular processing or formatting used by record provider 15b. To account for such formatting differences, and prior to a comparison by comparison component 23, transformation component 22 may be used to transform the APN in the second set of information according to a predetermined sequence of textual manipulations. For example, the character "-" may be removed, leading zeroes may be removed, and other like formatting changes can be made to provide information in a consistent or predetermined format. Transformation component 22 may create a transformed data field for the APN in the second set of information.

With the data transformed into a consistent format, comparison component 23 may compare the transformed data field for the APN in the second set of information with the data field for the APN in the first set of information. Based on this comparison, and assuming the APNs of both sets of information match, system 10 may indicate that both sets of information from both record providers 15a and 15b refer to the same property record transaction. System 10 may in a similar manner compare (through comparison component 23) other relevant or pre-determined data fields for the property record (e.g., sales price, the sales date, etc.) in data fields of the first set of information with like information in data fields of the second set of information. Transformation component 22 may create transformed data fields as needed in case of processing or formatting differences related to those data fields, so that the fields can be properly compared.

The various determinations by comparison component 23 may be used by verification component 24 to determine a verification score for the property record of interest. For example, if all data fields from both sets of information match perfectly, the resulting verification score may be 100%. If both the sales price and the sales date are mismatching, the verification score may be 0%. If the sales price matches perfectly, but the sales date is off by 1 day, the verification score may be a number between 0 and 100%. In some implementations, the effect of such a mismatch may depend on who the interested party is. For example, for some types of interested party, the sales date may be of minor significance (e.g., this may be reflected by a small weighting factor), such that a mismatch merely lowers the verification score to 90%. For example, for some types of interested party, the sales date may of major significance (e.g., this may be reflected by a large weighting factor), such that a mismatch lowers the verification score to 10%.

In some implementations, mismatches may be quantified, and the effect of a mismatch may be based on such a quantification. For example, a mismatch of 1 day may be considered insignificant, but a mismatch of more than 1 year may be considered significant. In other words, the significance may be duration-based or otherwise based on the magnitude of the error or difference. System 10 may attribute different weighting factors to different types of data fields or to different types of errors in order to determine or produce a verification score.

System 10, in particular storage component 25, may store verification scores for future use. For example, in some implementations, system 10 may determine verification scores for many property records and many real estate properties, even prior to any party (e.g. a buyer) expressing interest. The exemplary use cases (including the preceding exemplary use case) are not intended to limit the scope of this disclosure in any way. Instead, this use cases merely clarify some basic features of the operation of system 10, including but not limited to the way system 10 and its components (e.g. reception component 21, transformation component 22, comparison component 23, verification component 24, and storage component 25) may interact with record providers 15, users and other interested parties.

Referring to FIG. 1, one or more physical processors 20 may be configured to provide information processing capabilities in system 10 and server 11. As such, physical processor 20 may include one or more of a digital processor, an analog processor, a digital circuit designed to process information, an analog circuit designed to process information, a state machine, or other mechanisms for electronically processing information. Although physical processor 20 may be shown in FIG. 1 as a single entity, this is for illustrative purposes only. In some implementations, physical processor 20 may include a plurality of processing units. These processing units may be physically located within the same device, or physical processor 20 may represent processing functionality of a plurality of devices operating in coordination (e.g., "in the cloud", or other virtualized processing solutions).

Reception component 21 may be configured to receive or otherwise obtain information. In some implementations, reception component 21 may be configured to obtain information via network interface 77, for example. In some implementations, reception component 21 may be configured to obtain information from one or more servers. For example, the one or more servers may be associated with one or more record providers 15. The information obtained by reception component 21 may include one or more sets of information that are based on property records, including but not limited to public property records or public property record transactions. Individual sets of information may include data fields that are associated with characteristics of individual property records. In some implementations, reception component 21 may be configured to obtain a first set of information from a first record provider 15a, a second set of information from a second record provider 15b, a third set of information from a third record provider 15c, and so forth. The first set of information may be based on a first property record. The second set of information may be based on a second property record. In some implementations, one or more data fields in the first set of information may correspond to one or more data fields in the second set of information. In some implementations, the first property record and the second property record may correspond to the same real estate property. As used herein, the term "obtain" (and derivatives thereof) may include active or passive retrieval, receipt, determination, derivation, transfer, upload, download, submission, or exchange of information, or any combination of these actions.

The characteristics of a property record may depend on the type of property record. For example, the characteristics may include one or more of the names of one or more parties involved in a real estate transaction, the date of a real estate transaction, the date of recording, the price and other consideration pertaining to a real estate transaction, a mortgage amount, a promissory note amount, a loan amount, an identifying key of a recording, an instrument number, a recorder's book number, a recorder's page number, a document number, an assessor parcel number (APN), a street address, a county tax amount, a city tax amount, a transfer tax amount, listing information, and other information pertinent to a real estate property or a real estate transaction.

By way of illustration, FIG. 3A illustrates a portion 300 of a public property record from the county of Sacramento. In the center, the string "199908302162" includes the recorder's book number, the recorder's page number, and the year of the transaction. The date of the transaction is also included: "08/30/99." FIG. 3B illustrates a portion 301 of two sets of information from a first record provider. The bottom row corresponds to FIG. 3A. FIG. 3C illustrates a portion 302 of two sets of information from a second record provider. The bottom row corresponds to FIG. 3A. As illustrated in FIG. 3B and FIG. 3C, the formatting differences between both bottom rows prevent a straightforward comparison. By first transforming one or both sets of information to a common format, a comparison may subsequently be performed.

Transformation component 22 may be configured to transform information. In some implementations, transformation component 22 may be configured to transform data fields from set of information (e.g. as obtained by reception component 21) to create transformed data fields. For example, in some implementations, transformation component 22 may be configured to transform a data field included in a set of information from first record provider 15*a* to create a transformed data field. This transformed data field may correspond to one or more data fields from another set of information that has been obtained from second record provider 15*b* that is different, distinct, or separate from first record provider 15*a*. Prior to a comparison between data fields from different sets of information, transformation component 22 may be used to transform one or both sides of the comparison. In some implementations, a particular data field may be formatted sufficiently similar among multiple sets of information such that a transformation step is not needed (e.g. for a date).

Transformation component 22 may be configured to transform data fields through one or more types of textual manipulation or other types of transformation. As used herein, the term "textual manipulation" includes any type of string manipulation, regardless of whether the individual components of a data field are letters, numbers, symbols or alphanumeric. Transformations may enable comparisons between information or data fields that have different formatting. The one or more types of textual manipulation may include, by way of non-limiting example, truncation, padding, transposition, insertion, concatenation, addition, arithmetic operation, or other types of textual manipulation. For example, a particular data field may be truncated by removing extraneous information in the particular data field. For example, a particular data field may be padded by adding additional information to the particular data field (e.g., a number field padded with leading zeros). As other examples, elements within a particular data field may be rearranged in a different order, were broken out with as separate strings separated by hyphens.

Combinations of multiple types of textual manipulation can be accomplished by embodiments of the systems and methods disclosed herein. For example, the contents of a particular data field (which may be referred to as a "string") may be transformed by a specific sequence of textual manipulations, such as "remove the last three digits of the string, add two zeroes between the $5^{th}$ and $6^{th}$ digit of the remaining string, swap the first and last digit of the remaining string." Combinations of multiple types of textual manipulation in which one or more types of manipulation are used more than once are contemplated within the scope of this disclosure. For example, the contents of a particular data field may be transformed by a specific sequence of textual manipulations, such as "swap the $2^{nd}$ and $3^{rd}$ digit of the string, add the value '20' to the number represented by the $1^{st}$ $2^{nd}$ and $3^{rd}$ digit, swap the substring consisting of the $1^{st}$ through the $4^{th}$ digit with the highest four digits in the string." For example, elements within the string may be left shifted or right-shifted within a substring. For example, elements within the string may be multiplied by a predetermined number. In some implementations, a sequence of textual manipulations may be defined or prescribed by a template, recipe, or algorithm. In some implementations, such templates may be referred to as transformation templates.

By way of illustration, FIG. 4A illustrates a portion 400 of a grant deed from the county of Alameda, which includes an assessor parcel number (APN). FIG. 4B illustrates a portion 401 of several sets of information from two record providers, with the bottom row corresponding to FIG. 4A. The left-most two columns correspond to the recording date extracted by both record providers. The next two columns correspond to the document number extracted by both record providers. The right-most two columns correspond to the APN extracted by both record providers. As illustrated in FIG. 4B, the formatting differences between the APN columns prevent a straightforward comparison. By first transforming one or more column, a comparison may subsequently be performed.

Referring to FIG. 1, comparison component 23 may be configured to determine whether two or more sets of information (e.g. a first set of information and a second set of information) refer to or are based on the same property record, the same real estate property, or the same real estate transaction. In some implementations, comparison component 23 may be configured to determine whether one or more data fields from different sets of information (i.e. from different record providers 15*a*, 15*b*, 15*c*, etc.) refer to the same property record, the same real estate property, or the same real estate transaction. In some implementations, comparison component 23 may be configured to determine whether different sets of information are consistent, e.g. whether the characteristics associated with a first set of information are consistent with the characteristics associated with a second set of information. In some implementations, determinations by comparison component 23 may be either affirmative or negative. In some implementations, determinations by comparison component 23 may reflect a percentage or likelihood of a match. As used herein, the term "determine" (and derivatives thereof) may include measure, calculate, compute, estimate, approximate, generate, or otherwise derive, and may include any combination thereof.

By way of illustration, FIG. 7 illustrates an overview 700 of comparisons among three sets of information from three different record providers 15*a*, 15*b*, and 15*c*, referenced in this figure as "Source A", "Source B", and "Source C". Based on the comparisons, Source A and Source C are deemed accurate and higher quality than Source B. In particular, the sales price amount for Source B appears to mismatch with the other sources.

In some implementations, a determination (e.g., a comparison) by comparison component 23 may be based on a known tax rate related to the particular geographical area of a real estate property. For example, the amounts listed on a property record may include one or more of a county tax, a city tax, a transfer tax, and other types of taxes. If the amount in taxes paid is known, and the tax rate is known, then the sales price can be derived to fall within a particular range of sales prices. Such a range can be used for comparisons.

By way of illustration, FIG. 6A illustrates a portion 600 of a recorded deed from the county of San Diego, which includes transfer tax information, but no sales price. FIG. 6B illustrates a portion 601 of several sets of information from two record providers, in which the sales price has been inferred. The right-most two columns correspond to the transfer tax extracted by both record providers. As illustrated in FIG. 6A, the correct transfer tax is $182.05. The extracted value of $162.05 (in the right-most column) is incorrect, and therefore the inferred sales price is incorrect.

Figure 8:
FIG. 8 illustrates an overview of results obtained after comparing sets of information that have differences.

In some implementations, mismatches between sets of information from different record providers 15 may be tracked and recorded. For example, system 10 may keep track of which record provider provided correct information and which record provider provided wrong information. Over time, and by analyzing many mismatches, system 10 may predict a likelihood of a particular record provider having provided wrong information in case of a mismatch. For example, for a particular type of property record or data field, first record provider 15*a* may be three times more likely to be correct than second record provider 15*b* in case of a mismatch between first record provider 15*a* and second record provider 15*b*. For example, for a particular type of property record or data field, third record provider 15*c* may be two times more likely to be correct than second record provider 15*b* in case of a mismatch between third record provider 15*c* and second record provider 15*b*. Such statistical information may be used to predict how mismatches should or will be resolved. For example, generation component 28 may be configured to use such statistical information. By way of illustration, FIG. 8 illustrates an overview 800 of results obtained after comparing 22348 sets of information that have differences, the sets of information having been obtained from two record providers referred to as "Source A" and "Source B". As depicted in FIG. 8, Source A is statistically three times more accurate than Source B.

Verification component 24 may be configured to determine scores, including verification scores, for property records, real estate properties, real estate transactions, and other verifiable information. In some implementations, determinations by verification component 24 may be based on determinations or information from other components in system 10, including but not limited to determinations from comparison component 23. In some implementations, a verification score may be binary (e.g. "Verified" or "Unverified"), a percentage that reflects the level of confidence in the verifiable information, a letter grade that reflects the quality of the verifiable information, or other information that is related to the verifiable information, as well as combinations thereof. For example, a verification score for a particular property record may be based on a first determination and a second determination. The first determination, by comparison component 23, may be whether two sets of information (from different record providers 15) refer to the same property record.

In some implementations, such a first determination may be based on one or more of a recorder's book number, a recorder's page number, an instrument number, a document number, an assessor parcel number, or other information (or combination thereof). The second determination, by comparison component 23, may be whether the characteristics associated with two different sets of information (from different record providers 15) are consistent. In some implementations, the second determination may be based on one or more of a sales price, a sales date, a mortgage amount, and other information. For example, if the first determination fails, the resulting verification score may be "no," "0%," "negative," "unverified," or other scores that indicate no or little confidence in some particular verifiable information. Subsequent to both the first determination succeeding and the pertinent information matching, the resulting verification score may be "yes," "100%," "positive," "verified," and other scores that indicate substantial or full confidence in some particular verifiable information.

Storage component 25 may be configured to manage, store, retrieve, and otherwise access information in electronic storage 60. The stored information may be available for future access. The stored information may include verification scores, information based on property records, determinations or parameters from system 10 or its components, and other information.

Extraction component 26 may be configured to determine and extract particular or specific information from property records, real estate properties, real estate transactions, and other verifiable information. For example, extraction component 25 may be configured to determine and extract geographical information from a property record. For example, extraction component 26 may be configured to determine a street address, zip code, fips code, county, and other geographical information from a set of information provided by record provider 15 (or from the one or more data fields included therein). For example, extraction component 25 may be configured to determine and extract calendar information from a property record. For example, extraction component 26 may be configured to determine a date, a time of day, a month, a year, and other calendar information from a set of information provided by record provider 15 (and from the one or more data fields included therein). Information determine and extracted by extraction component 26 may be used by other components of system 10, including but not limited by template component 27 as an index into one or more databases.

Template component 27 may be configured to access one or more databases, information repositories, tables, and other data structures to retrieve information. The retrieved information may include templates, including but not limited to transformation templates. Individual transformation templates may prescribe or define one or more steps to transform a particular data field (or multiple particular data fields) into a transformed data field (or multiple transformed data fields). In some implementations, the one or more databases may be indexed based on geographical information (e.g. in which county is a particular real estate property located), calendar information (e.g. what is the sales date of the most recent real estate transaction of a particular real estate property), information determined by extraction component 26, and other information suitable as index to a database. The information itself or the formatting of the information of a property record may be county-specific (or otherwise specific to a particular geographical area). For example, in some counties, the information in a set of information may include a recorder's book number and a recorder's page number. For example, in some counties, the information in a set of information may include a document number instead of a recorder's book number or recorder's page number. In some cases, the same county may use both the preceding formatting styles based on a date when the county transitioned from using recorder's book and page numbers to using document numbers. In this latter example, the formatting may be both county-specific and sales-date specific.

In some implementations, template component 27 may be configured to retrieve a particular transformation template based on the specific county of a particular real estate property (or the county in which the particular real estate property is located). For example, in some implementations, template component 27 may be configured to retrieve a particular transformation template based on multiple factors, including the specific county in which the particular real estate property is located and the date of the most recent real estate transaction involving the particular real estate property.

By way of illustration, FIG. 5 illustrates a set 500 of examples of differences in formatting between different record providers. The left-most two columns correspond to the document number extracted by both record providers. The right-most two columns correspond to the APN extracted by both record providers. All rows with the exception of row 501 and row 502 include data fields that correspond to the same property record.

By way of illustration, FIG. 9A illustrates a so-called verified record (or verified set of information) for a particular property record. This information may have been extracted from two sets of information from different record providers. However, if the property record has an error, these sets of information will likely have the same error, and the verified record will likely have the same error as well. FIG. 9B illustrates listing information in which the first row corresponds to the same property as the information in FIG. 9A. By comparing the sets of information with an independent source of information (in this case an MLS listing), system 10 may provide more accurate information to its users and/or customers. In this specific example, the purchase loan is with the Federal Housing Administration (FHA). These loans typically require a 3% down payment, with an allowable 1% closing cost that can be financed. Based on the available information, as well as knowledge of the FHA program, the $135K sales price seems too high and likely wrong. The sales price of $125K is more likely to be correct.

Referring to FIG. 1, generation component 28 may be configured to generate, assemble, create, and otherwise produce a set of information pertaining to a particular real estate property that includes data fields from different sets of information provided by different record providers 15. For example, generation component 28 may be configured to combine data fields from two sets of information: a first set of information provided by first record provider 15a and a second set of information provided by second record provider 15b. The combined data fields may form a single set of information associated with a single real estate property. By combining data fields from multiple sources, the resulting set of information may be more reliable than a single set of information. In some implementations, generation component 28 may be configured to combine data fields from three or more sets of information: a first set of information provided by first record provider 15a, a second set of information provided by second record provider 15b, a third set of information provided by third record provider 15c, and so forth. The combined data fields may form a single set of information associated with a single real estate property. By combining data fields from three or more sources, the resulting set of information may be more reliable than a single set of information, or even two sets of information. For example, in case of mismatches between data fields from different record providers, generation component 28 may be configured to use a particular data field if it matches between the data fields of the majority of available sets of information from different record providers. For example, in case of three record providers 15, generation component 28 may be configured to use a particular data field (in generating a reliable single set of information) if it matches between at least two data fields from two different record providers.

In some implementations, data fields included in sets of information may be weighted according to a factor (e.g. a reliability factor) that reflects the level of (estimated or otherwise determined) confidence, reliability, or quality of individual data fields or entire sets of information. In some implementations, generation component 28 may be configured to select particular data field (for inclusion on a reliable single set of information) such that the resulting set of information is associated with the highest available weight. In other words, system 10 may be configured to perform an optimization in selecting data fields, wherein the optimization is based on the weight factors. By way of illustration, FIG. 7 illustrates an overview 700 of comparisons among three sets of information from three different record providers 15a, 15b, and 15c, referenced in this figure as "Source A", "Source B", and "Source C". The different types of information depicted here ("parcel number" or APN, "price amount" or sales price, "sale date", and "mortgage amount") have different relatives weights assigned. For example, sales price is deemed more important than the date of sale. The relative weights may be dependent on the type of product, and/or the ultimate consumer of the produced information.

By way of illustration, FIG. 10 illustrates an overview 1000 of comparisons among three sets of information from three different record providers 15a, 15b, and 15c, referenced in this figure as "Source B", "Source C", and "Source D". The different types of information depicted here ("parcel number" or APN, "price amount" or sales price, "sale date", and "mortgage amount") are compared among the different sources. Generation component 28 may be configured to combine data fields from three sources (here: source B, Source C, and Source D) based on which combination produces the highest weighted composite score.

As used herein, any association (or relation, or reflection, or indication, or correspondency) involving users, property records, record providers, real estate properties, sets of information, data fields, transformed data fields, characteristics of property records, determinations by any component, verification scores, instrument numbers, assessor parcel numbers (APNs), sales prices, textual manipulations, transformations, geographical locations, templates, databases, calendar information, client computing platforms, or another entity or object that interacts with any part of the system or plays a part in the operation of the system, may be a one-to-one association, a one-to-many association, a many-to-one association, or a many-to-many association or N-to-M association (note that N and M may be different numbers greater than 1).

It should be appreciated that although components 21-28 are illustrated in FIG. 1 as being located or co-located within a particular component of system 10, in implementations in which physical processor 20 includes multiple processing units, one or more of components 21-28 may be located remotely from the other components. The description of the functionality provided by the different components 21-28 described herein is for illustrative purposes, and is not intended to be limiting, as any of components 21-28 may provide more or less functionality than is described. For example, one or more of components 21-28 may be eliminated, and some or all of its functionality may be incorporated, shared, integrated into, or otherwise provided by other ones of components 21-28. Note that physical processor 20 may be configured to execute one or more additional components that may perform some or all of the functionality attributed below to one of components 21-28.

Electronic storage 60 in FIG. 1 comprises electronic storage media that electronically stores information. The electronic storage media of electronic storage 60 may include one or both of system storage that is provided integrally (i.e., substantially non-removable) with system 10 or removable storage that is connectable to system 10 via, for example, a port (e.g., a USB port, a FIREWIRE™ port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and other electronically readable storage media. Electronic storage 60 may store software algorithms, information determined by physical processor 20 or any computer program components, information received via a user interface, and other information that enables system 10 to function properly. For example, electronic storage 60 may store verification scores, sets of information, and other information. Electronic storage 60 may be a separate component within system 10, or electronic storage 60 may be provided integrally with one or more other components of system 10 (e.g., physical processor 20).

User interface 76 of system 10 in FIG. 1 may be configured to provide an interface between system 10 and a user (e.g. a remote user using a graphical user interface) through which the user can provide information to and receive information from system 10. This enables data, results, instructions, and any other communicable items, collectively referred to as "information," to be communicated between the user and system 10. An example of information that may be conveyed to a user is verification scores, data from a set of information, and other information. Examples of interface devices suitable for inclusion in user interface 76 include a keypad, buttons, switches, a keyboard, knobs, levers, a display screen, a touch screen, speakers, a microphone, an indicator light, an audible alarm, and a printer. Information may be provided to a user by user interface 76 in the form of auditory signals, visual signals, tactile signals, and other sensory signals.

It is to be understood that other communication techniques, either hard-wired or wireless, are also contemplated herein as user interface 76. For example, in one implementation, user interface 76 may be integrated with a removable storage interface provided by electronic storage 60. In this example, information is loaded into system 10 from removable storage (e.g., a smart card, a flash drive, a removable disk, etc.) that enables the user(s) to customize system 10. Other exemplary input devices and techniques adapted for use with system 10 as user interface 76 include, but are not limited to, an RS-232 port, RF link, an IR link, modem (telephone, cable, Ethernet, internet or other). In short, any technique for communicating information with system 10 is contemplated as user interface 76.

Network interface 77 of system 10 in FIG. 1 may be configured to transmit information from a client computing platform 14 to another component of system 10, e.g. through network 13. In some implementations, network interface 77 may be configured to receive information from a component of system 10, e.g. through network 13. In some implementations, network interface 77 may be configured to receive information from network 13 for delivery to system 10 or components thereof. For example, in some implementations, information may be received via network interface 77 from a server associated with one or more record providers 15. In some implementations, network interface 77 may be configured to process user input received through user interface 76. In some implementations, network interface 77 may be configured to generate packets of information that include, reflect, represent, or otherwise are based on the received user input or that are further based on operations of system 10. In some implementations, network interface 77 may be configured to transmit, e.g. through a wireless protocol, generated packets of information. In some implementations, network interface 77 may be configured to transmit generated packets of information over a data channel or over a wireless communication channel, e.g. to a wireless device (for example, a client computing platform 14). In some implementations, network interface 77 may include one or more of a physical processor (which may be similar to physical processor 20 described herein), electronic storage (which may be similar to electronic storage 60 described herein), a transmitter, a receiver, and other components.

Figure 2:
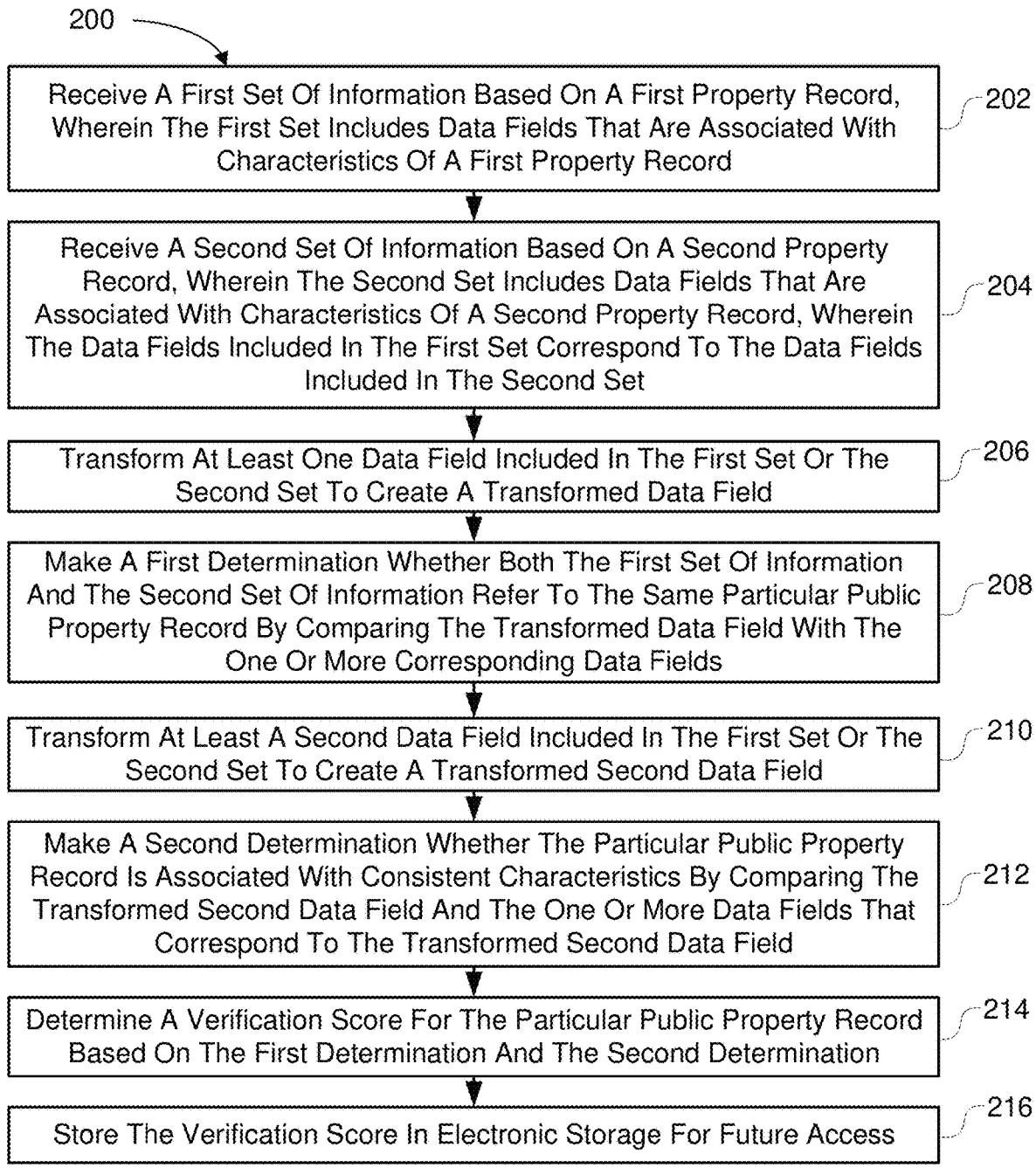
FIG. 2 illustrates a method for verification of property records in accordance with one or more embodiments of the technology described herein.

FIG. 2 illustrates an exemplary method 200 for verification of public property records. The operations of method 200 presented below are intended to be illustrative and non-limiting examples. In certain embodiments, method 200 may be accomplished with one or more additional operations not described, or without one or more of the operations discussed. Additionally, the order in which the operations of method 200 are illustrated in FIG. 2 and described below is not intended to be limiting.

In certain embodiments, method 200 may be implemented in one or more processing devices (e.g., a digital processor, an analog processor, a digital circuit designed to process information, an analog circuit designed to process information, and other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, software, or combinations thereof to be specifically designed for execution of one or more of the operations of method 200.

Regarding method 200, at an operation 202, a first set of information based on a first property record is received from a first server associated with a first record provider. The first set includes data fields that are associated with characteristics of the first property record. In some embodiments, operation 202 is performed by a reception component the same as or similar to reception component 21 (shown in FIG. 1 and described herein).

At an operation 204, a second set of information based on a second property record is received from a second server associated with a second record provider. The second set includes data fields that are associated with characteristics of the second property record. The data fields included in the first set correspond to the data fields included in the second set. In some embodiments, operation 204 is performed by a reception component the same as or similar to reception component 21 (shown in FIG. 1 and described herein).

At an operation 206, at least one data field included in the first set or the second set is transformed to create a transformed data field. Responsive to the at least one data field being included in the first set, the at least one data field corresponds to one or more data fields included in the second set. Responsive to the at least one data field being included in the second set, the at least one data field corresponds to one or more data fields included in the first set. In some embodiments, operation 206 is performed by a transformation component the same as or similar to transformation component 22 (shown in FIG. 1 and described herein).

At an operation 208, a first determination is made whether both the first set of information and the second set of information refer to the particular public property record by comparing the transformed data field with the one or more corresponding data fields. In some embodiments, operation 208 is performed by a comparison component the same as or similar to comparison component 23 (shown in FIG. 1 and described herein).

At an operation 210, at least a second data field included in the first set or the second set is transformed to create a transformed second data field. Responsive to the second data field being included in the first set, the second data field corresponds to one or more data fields included in the second set. Responsive to the second data field being included in the second set, the second data field corresponds to one or more data fields included in the first set. In some embodiments, operation 210 is performed by a transformation component the same as or similar to transformation component 22 (shown in FIG. 1 and described herein).

At an operation 212, a second determination is made whether the particular public property record is associated with consistent characteristics by comparing the transformed second data field and the one or more data fields that correspond to the transformed second data field. In some embodiments, operation 212 is performed by a comparison component the same as or similar to comparison component 23 (shown in FIG. 1 and described herein).

At an operation 214, a verification score is determined for the particular public property record based on the first determination and the second determination. In some embodiments, operation 214 is performed by a verification component 24 the same as or similar to verification component 24 (shown in FIG. 1 and described herein).

At an operation 216, the verification score is stored in the electronic storage for future access. In some embodiments, operation 216 is performed by a storage component the same as or similar to storage component 25 (shown in FIG. 1 and described herein).

Although the disclosed technology has been described in detail for the purpose of illustration based on what is currently considered to be the most practical and preferred embodiments, it is to be understood that such detail is solely for that purpose and that the disclosure is not limited to any particular embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. One or more non-transitory computer-readable mediums storing instructions that, when executed by one or more processors, cause the one or more processors to perform operations comprising:
   receiving a first set of information based on a first property record of a first record provider, the first set of information including a first plurality of data fields associated with a plurality of property record characteristics of a real property;
   receiving a second set of information based on a second property record of a second record provider, the second set of information including a second plurality of data fields associated with the plurality of property record characteristics;
   determining that the first set of information and the second set of information refer to the same property record by matching one or more real property identifiers;
   transforming, using one or more types of textual manipulations prescribed by a transformation template, the first plurality of data fields or the second plurality of data fields, wherein application of the transformation template to data fields of different sets of information containing the same types of property record characteristics provides consistency among same types of data fields;
   after transforming the first plurality of data fields or the second plurality of data fields, determining differences between the first plurality of data fields and the second plurality of data fields by comparing each data field of the first plurality of data fields with a data field of the second plurality of data fields having the same type of property record characteristic;
   determining, based at least on a plurality of reliability factors and the differences between the first plurality of data fields and the second plurality of data fields, a verified plurality of data fields corresponding to the property record characteristics of the real property, wherein each of the reliability factors comprises a weight indicative of an accuracy of an individual record provider in providing sets of information relating to real properties; and
   storing the verified plurality of data fields.

2. The one or more non-transitory computer-readable mediums of claim 1, wherein:
   the operations further comprise:
      receiving a third set of information based on a third property record of a third record provider, the third set of information including a third plurality of data fields associated with the plurality of property record characteristics, and the third set of information referring to the same property record; and
      after transforming the first plurality of data fields or the second plurality of data fields, determining differences between the third plurality of data fields and the second plurality of data fields by comparing each data field of the third plurality of data fields with a data field of the second plurality of data fields having the same type of property record characteristic; and
   determining the verified plurality of data fields comprises:
      determining, based at least on the plurality of reliability factors, the differences between the first plurality of data fields and the second plurality of data fields, and the differences between the third plurality of data fields and the second plurality of data fields, the verified plurality of data fields.

3. The one or more non-transitory computer-readable mediums of claim 2, wherein the operations further comprise: prior to determining the differences between the third plurality of data fields and the second plurality of data fields, transforming, using the one or more types of textual manipulations prescribed by the transformation template, the third plurality of data fields.

4. The one or more non-transitory computer-readable mediums of claim 1, wherein:
the operations further comprise:
receiving a third set of information based on a third property record of a third record provider, the third set of information including a third plurality of data fields associated with the plurality of property record characteristics, and the third set of information referring to the same property record; and
after transforming the first plurality of data fields or the second plurality of data fields, making a determination that there are no differences between the first plurality of data fields and the third plurality of data fields by comparing each data field of the first plurality of data fields with a data field of the third plurality of data fields having the same type of property record characteristic; and
determining the verified plurality of data fields comprises:
determining, based at least on the plurality of reliability factors, the differences between the first plurality of data fields and the second plurality of data fields, and the determination that there are no differences between the first plurality of data fields and the third plurality of data fields, the verified plurality of data fields.

5. The one or more non-transitory computer-readable mediums of claim 4, wherein the operations further comprise: prior to making the determination that there are no differences between the first plurality of data fields and the third plurality of data fields, transforming, using the one or more types of textual manipulations prescribed by the transformation template, the third plurality of data fields.

6. The one or more non-transitory computer-readable mediums of claim 1, wherein:
each of the first plurality of data fields and the second plurality of data fields includes at least two of the following: a recording date, a recorder's book number, a recorder's page number, a document number, or an assessor parcel number (APN); and
comparing each data field of the first plurality of data fields with a data field of the second plurality of data fields having the same type of property record characteristic comprises making two or more of the following comparisons:
comparing the recording date of the first plurality of data fields with the recording date of the second plurality of data fields;
comparing the recorder's book number of the first plurality of data fields with the recorder's book number of the second plurality of data fields;
comparing the recorder's page number of the first plurality of data fields with the recorder's page number of the second plurality of data fields;
comparing the document number of the first plurality of data fields with the document number of the second plurality of data fields; or
comparing the APN of the first plurality of data fields with the APN of the second plurality of data fields.

7. The one or more non-transitory computer-readable mediums of claim 1, wherein:
each of the first plurality of data fields and the second plurality of data fields includes at least two of the following: an APN, a mortgage amount, a sales price, a sales date, or a transfer tax; and
comparing each data field of the first plurality of data fields with a data field of the second plurality of data fields having the same type of property record characteristic comprises making two or more of the following comparisons:
comparing the APN of the first plurality of data fields with the APN of the second plurality of data fields;
comparing the mortgage amount of the first plurality of data fields with the mortgage amount of the second plurality of data fields;
comparing the sales price of the first plurality of data fields with the sales price of the second plurality of data fields;
comparing the sales date of the first plurality of data fields with the sales date of the second plurality of data fields; or
comparing the transfer tax of the first plurality of data fields with the transfer tax of the second plurality of data fields.

8. The one or more non-transitory computer-readable mediums of claim 1, wherein transforming, using the one or more types of textual manipulations prescribed by the transformation template, the first plurality of data fields or the second plurality of data fields, comprises: transforming, using the one or more types of textual manipulations prescribed by the transformation template, both the first plurality of data fields and the second plurality of data fields.

9. The one or more non-transitory computer-readable mediums of claim 1, wherein the operations further comprise: adjusting the plurality of reliability factors over time based at least on an accuracy of the first record provider and the second record provider in providing sets of information.

10. The one or more non-transitory computer-readable mediums of claim 1, wherein the operations further comprise: adjusting the plurality of reliability factors based on statistical information regarding a likelihood of errors in the first set of information from the first record provider or the second set of information from the second record provider.

11. The one or more non-transitory computer-readable mediums of claim 1, wherein the one or more types of textual manipulations prescribed by the transformation template include: truncation, padding, transposition, insertion, concatenation, addition, or arithmetic operation.

12. The one or more non-transitory computer-readable mediums of claim 1, wherein the transformation template is associated with a geographical location corresponding to the first property record and the second property record.

13. A method, comprising:
receiving, at a computing device, a first set of information based on a first property record of a first record provider, the first set of information including a first plurality of data fields associated with a plurality of property record characteristics of a real property;
receiving, at the computing device, a second set of information based on a second property record of a second record provider, the second set of information including a second plurality of data fields associated with the plurality of property record characteristics;

determining, at the computing device, that the first set of information and the second set of information refer to the same property record by matching one or more real property identifiers;

transforming, at the computing device, using one or more types of textual manipulations prescribed by a transformation template, the first plurality of data fields or the second plurality of data fields, wherein application of the transformation template to data fields of different sets of information containing the same types of property record characteristics provides consistency among same types of data fields;

after transforming the first plurality of data fields or the second plurality of data fields, determining, at the computing device, differences between the first plurality of data fields and the second plurality of data fields by comparing each data field of the first plurality of data fields with a data field of the second plurality of data fields having the same type of property record characteristic;

determining, at the computing device, based at least on a plurality of reliability factors and the differences between the first plurality of data fields and the second plurality of data fields, a verified plurality of data fields corresponding to the property record characteristics of the real property, wherein each of the reliability factors comprises a weight indicative of an accuracy of an individual record provider in providing sets of information relating to real properties; and storing the verified plurality of data fields in an electronic storage.

14. The method of claim 13, wherein:
the method further comprises:
receiving, at the computing device, a third set of information based on a third property record of a third record provider, the third set of information including a third plurality of data fields associated with the plurality of property record characteristics, and the third set of information referring to the same property record; and after transforming the first plurality of data fields or the second plurality of data fields, determining, at the computing device, differences between the third plurality of data fields and the second plurality of data fields by comparing each data field of the third plurality of data fields with a data field of the second plurality of data fields having the same type of property record characteristic; and determining the verified plurality of data fields comprises:
determining, at the computing device, based at least on the plurality of reliability factors, the differences between the first plurality of data fields and the second plurality of data fields, and the differences between the third plurality of data fields and the second plurality of data fields, the verified plurality of data fields.

15. The method of claim 14, further comprising: prior to determining the differences between the third plurality of data fields and the second plurality of data fields, transforming, at the computing device, using the one or more types of textual manipulations prescribed by the transformation template, the third plurality of data fields.

16. The method of claim 13, wherein:
the method further comprises:
receiving, at the computing device, a third set of information based on a third property record of a third record provider, the third set of information including a third plurality of data fields associated with the plurality of property record characteristics, and the third set of information referring to the same property record; and after transforming the first plurality of data fields or the second plurality of data fields, making a determination at the computing device that there are no differences between the first plurality of data fields and the third plurality of data fields by comparing each data field of the first plurality of data fields with a data field of the third plurality of data fields having the same type of property record characteristic; and determining the verified plurality of data fields comprises:
determining, at the computing device, based at least on the plurality of reliability factors, the differences between the first plurality of data fields and the second plurality of data fields, and the determination that there are no differences between the first plurality of data fields and the third plurality of data fields, the verified plurality of data fields.

17. The method of claim 16, further comprising: prior to making the determination that there are no differences between the first plurality of data fields and the third plurality of data fields, transforming, at the computing device, using the one or more types of textual manipulations prescribed by the transformation template, the third plurality of data fields.

18. The method of claim 13, wherein:
each of the first plurality of data fields and the second plurality of data fields includes at least two of the following: a recording date, a recorder's book number, a recorder's page number, a document number, or an assessor parcel number (APN); and comparing each data field of the first plurality of data fields with a data field of the second plurality of data fields having the same type of property record characteristic comprises making two or more of the following comparisons:
comparing the recording date of the first plurality of data fields with the recording date of the second plurality of data fields;
comparing the recorder's book number of the first plurality of data fields with the recorder's book number of the second plurality of data fields;
comparing the recorder's page number of the first plurality of data fields with the recorder's page number of the second plurality of data fields;
comparing the document number of the first plurality of data fields with the document number of the second plurality of data fields; or
comparing the APN of the first plurality of data fields with the APN of the second plurality of data fields.

19. The method of claim 13, wherein:
each of the first plurality of data fields and the second plurality of data fields includes at least two of the following: an APN, a mortgage amount, a sales price, a sales date, or a transfer tax; and comparing each data field of the first plurality of data fields with a data field of the second plurality of data fields having the same type of property record characteristic comprises making two or more of the following comparisons:
comparing the APN of the first plurality of data fields with the APN of the second plurality of data fields;
comparing the mortgage amount of the first plurality of data fields with the mortgage amount of the second plurality of data fields;

comparing the sales price of the first plurality of data fields with the sales price of the second plurality of data fields;

comparing the sales date of the first plurality of data fields with the sales date of the second plurality of data fields; or comparing the transfer tax of the first plurality of data fields with the transfer tax of the second plurality of data fields.

20. The method of claim 13, wherein transforming, at the computing device, using the one or more types of textual manipulations prescribed by the transformation template, the first plurality of data fields or the second plurality of data fields, comprises: transforming, at the computing device, using the one or more types of textual manipulations prescribed by the transformation template, both the first plurality of data fields and the second plurality of data fields.

* * * * *